United States Patent [19]

Miyakawa et al.

[11] 3,745,901

[45] July 17, 1973

[54] ELECTRICALLY CONTROLLED PHOTOGRAPHIC CAMERA SHUTTER APPARATUS

[75] Inventors: Seinan Miyakawa, Nobuhiro Noda, both of Tokyo; Mitsuhiko Shimoda, Niiza, all of Japan

[73] Assignee: Asahi Kogaku Kogyo Kabushiki Kaisha, Tokyo to, Japan

[22] Filed: May 9, 1972

[21] Appl. No.: 251,721

[52] U.S. Cl. ............... 95/53 EB, 317/123, 317/151
[51] Int. Cl. ...... G03b 9/58, H01f 7/18, H01h 47/22
[58] Field of Search ........... 95/10 CT, 53 E, 53 EA, 95/53 EB; 317/123, 124, 148.5, 151, 157

[56] References Cited
UNITED STATES PATENTS

| 3,455,218 | 7/1969 | Eagle et al. | 95/53 EB |
| 3,554,102 | 1/1971 | Maronde | 95/53 EA |
| 3,447,031 | 5/1969 | Jenks | 317/151 |
| 3,685,035 | 8/1972 | McClain et al. | 317/151 |

*Primary Examiner*—Joseph F. Peters, Jr.
*Attorney*—Harold D. Steinberg et al.

[57] ABSTRACT

A camera capable of automatically determining the exposure time and having interchangeable objectives. One of the factors which determines the extent of exposure is the magnitude of the aperture through which light enters the camera. This factor is introduced either by way of one variable resistor which coacts with an objective which remains wide open and which is automatically stopped down to a preselected aperture just prior to exposure, or by way of a second variable resistor adapted to be used in the situation where the objective is not automatically stopped down just prior to exposure and instead has its diaphragm in a stopped down condition restricting travel of light passing through the objective with this light being measured after passing through the stopped down diaphragm. These variable resistors are connected in parallel and a selecting switch is provided for utilizing one or the other of the variable resistors depending upon the type of objective which is used. In addition, in order to render an electromagnet operative in the shortest possible time, the electromagnet is supplied with power not only from a conventional voltage source but also from a capacitor which is preliminarily charged.

4 Claims, 4 Drawing Figures

ELECTRICALLY CONTROLLED PHOTOGRAPHIC CAMERA SHUTTER APPARATUS

BACKGROUND OF THE INVENTION

The present invention relates to cameras.

In particular, the present invention relates to that type of camera which has a circuitry for automatically determining the extent to which film in the camera is exposed.

The determination of the extent of exposure is brought about in response to exposure-determining factors among which are such factors as the lighting conditions, the size of the aperture through which the exposure is made, and the speed of the film.

It is known to determine the factor according to the lighting conditions by measuring light traveling from the object to be photographed through the camera objective, after the light has passed through the objective, so that influence of the objective itself on the light is taken into consideration in the measurement thereof.

When using a camera of this latter type, there are two basically different types of objectives which are available with cameras which can accept interchangeable objectives, such as single lens reflex cameras. Thus, one very well known type of objective is a so-called automatic objective which enables the object to be photographed and the light to be measured while the diaphragm is wide open. With an objective of this type the diaphragm setting ring is set to provide a preselected aperture which is automatically achieved by automatic stopping down of the diaphragm just prior to exposure. However, such cameras also use non-automatic objectives which must be manually stopped down to the aperture which will give a proper exposure, and when it is necessary to measure light which travels through such a stopped down diaphragm problems are encountered with conventional cameras. Thus, the factor of the size of the exposure aperture must be added to a factor such as the lighting conditions in order to determine the proper exposure, and the addition of these factors creates problems where objectives of the above two basic types are interchangeably used.

It is also conventional with cameras of this type to utilize an electromagnet for determining when an exposure is terminated. Thus, the shutter of such cameras is conventionally a curtain type of shutter where a leading curtain first moves to open the shutter while a trailing curtain subsequently moves in order to close the shutter and terminate the exposure. This trailing curtain is released for movement to the shutter-closing position by deenergizing the electromagnet which is initially energized in order to hold the trailing curtain in its cocked position in opposition to the force of springs or the like which urge the trailing curtain toward its closed position. This electromagnet is conventionally energized just prior to opening of the shutter. Because of the magnitude of the power required to bring the electromagnet to its fully energized condition, the conventional voltage source of cameras of the above type is not sufficient to place the electromagnet in its operative, energized condition within the extremely short interval available just prior to opening of the shutter. These operations in connection with energizing of the electromagnet must take place in response to depression of the shutter-tripping plunger of the camera, and during movement of this latter plunger it is necessary to energize the electromagnet just prior to actual opening of the shutter, so that for these reasons an extremely short interval is available for placing the electromagnet in its operative condition. Thus, problems are also encountered in cameras of this type in connection with placing the electromagnet in its fully energized condition in the extremely short time which is available for this purpose when using a conventional voltage source.

SUMMARY OF THE INVENTION

It is accordingly a primary object of the present invention to provide a camera of the above general type which will avoid the above problems.

Thus, one of the objects of the present invention is to provide a camera of the above type with the possibility of using either an automatic objective where the diaphragm aperture is preselected with automatic stopping down taking place just prior to exposure or a non-automatic objective where the diaphragm is manually stopped down so that light is measured while traveling through the stopped down diaphragm.

In particular, it is an object of the invention to provide the circuitry of the camera with structure which will enable the factor of the size of the exposure aperture to be utilized in determination of the extent of exposure with either of these different types of objectives.

Furthermore, it is an object of the present invention to provide a camera of the above type with circuitry which will enable the electromagnet to be supplied with a sufficient amount of energy to achieve the fully energized condition in the extremely short time which is available for this purpose, as pointed out above.

Thus, recognizing that the electromagnet requires a large amount of power because of the large electromagnetic force which is required to maintain the trailing curtain in its cocked position, it is an object of the invention to make available the required large power source for the purpose of energizing the electromagnet to exert the required large attractive force within the extremely short time which is available for this purpose.

According to the invention the camera is provided with circuitry for automatically determining the extent to which film in the camera is exposed, and this circuitry includes a circuit for providing a signal according to the magnitude of the exposure aperture. This latter circuit comprises a first variable resistor means for introducing a signal according to a preselected diaphragm setting when using an objective which has a wide open aperture which is automatically stopped down to the preselected aperture just prior to exposure. This circuit further includes a second variable resistor means for introducing a signal according to the magnitude of the exposure aperture when using an objective which is not automatically stopped down to a preselected aperture, so that with the latter objective light measured after passing therethrough is restricted by the stopped down aperture. These first and second variable resistor means are connected in parallel with each other and respectively include electrically conductive adjustable components for determining the settings of the first and second variable resistor means. A switch means is operatively connected with the latter components for selectively connecting one or the other of these components to the circuitry.

Also, the camera has a power source electrically connected with the circuitry thereof for supplying energy thereto, and the circuitry further includes an electromagnetic means for terminating an exposure when the electromagnetic means becomes unenergized. A switch means electrically connects the power source and the electromagnetic means for energizing the latter just prior to opening of a shutter to start an exposure. A further means is electrically connected to the electromagnetic means through this latter switch means for supplying the electromagnetic means upon closing of the switch means with energy in addition to that supplied only by connecting the electromagnetic means to the power source through the switch means, so that in this way it is possible to reduce the time lag required for energizing the electromagnetic means to a minimum.

BRIEF DESCRIPTION OF DRAWINGS

The invention is illustrated by way of example in the accompanying drawings which form part of this application and in which:

FIG. 4 is a fragmentary wiring diagram of a different embodiment of circuitry for introducing the factor of aperture size.

DESCRIPTION OF PREFERRED EMBODIMENTS

Figure 1:
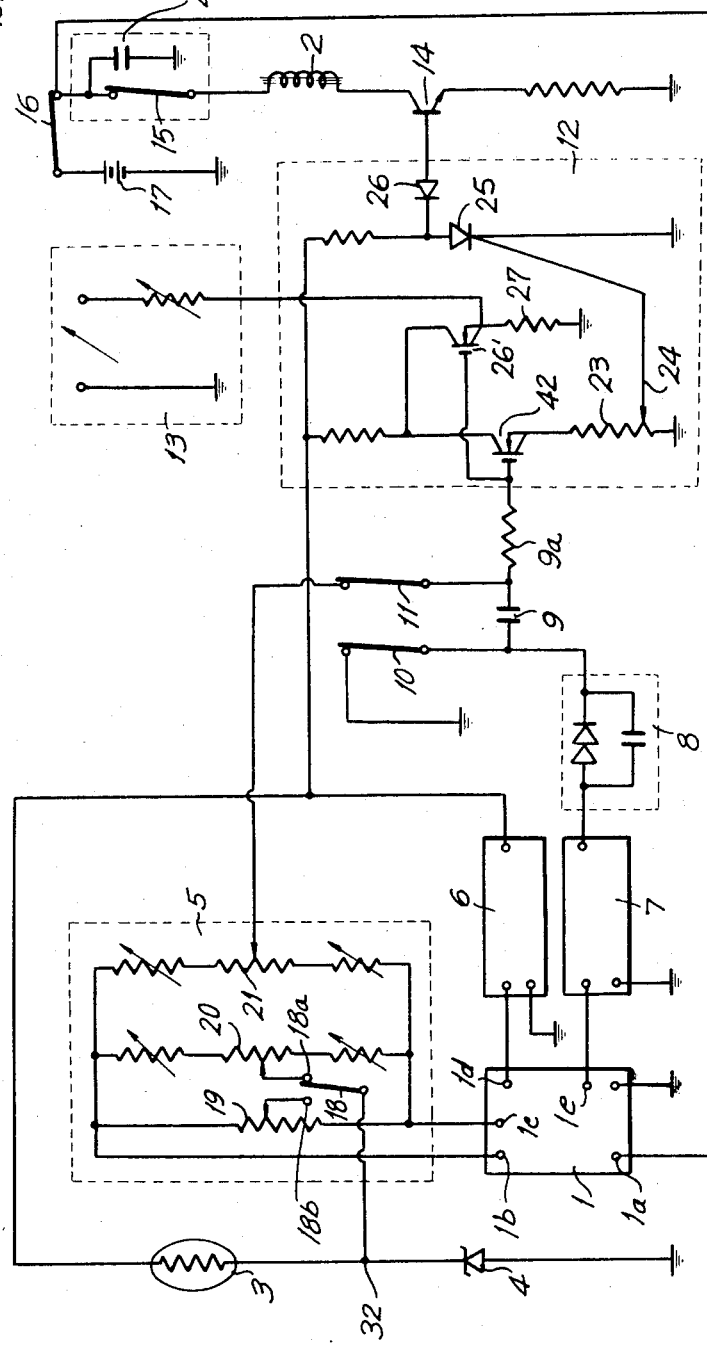
FIG. 1 is a partly schematic wiring diagram of circuitry for automatically determining exposure.

Referring to FIG. 1, the circuitry illustrated therein for determining the extent to which film in the camera is exposed includes a DC—DC converter 1 having an input terminal 1a electrically connected by way of a conductor 30 to a DC voltage source formed by the battery 17, this connection to the voltage source being provided by way of a main switch 16. By way of terminals 1b and 1c, the converter 1 is connected to a circuit means 5 which serves to introduce into the circuitry exposure-determining factors of the size of the exposure aperture and the speed of the film. This circuit means 5 is described in greater detail below. However, it will be seen that the circuit means 5 includes several variable resistor means which are connected in parallel. As illustrated in FIG. 1 the circuit means 5 is supplied directly from the converter 1, and this arrangement is provided because the current consumed by the circuit means 5 remains substantially constant.

Two additional circuits are energized with the output of the converter 1, and these two additional circuits have a variable current demand, so that in this case a constant voltage supply means formed by voltage regulators 6 and 7 is used, these voltage regulators also serving to compensate for thermal variations. Thus, by way of the output terminal 1d, the converter 1 is electrically connected to the voltage regulator 6, while by way of the output terminal 1e, the converter 1 is electrically connected to the voltage regulator 7. These regulators as well as the converter itself are suitably grounded, as illustrated in FIG. 1. Thus, the DC—DC converter 1 provides a circuit power source for the circuit 5, this latter power source being independent of the power source from the battery 17 which is somewhat increased or decreased to achieve output stability at the voltage regulators 6 and 7.

The circuit which is supplied from the voltage regulator 6 is a light-responsive circuit for converting the lighting conditions of the object to be photographed into a corresponding electrical signal. This light-responsive means which is supplied by the voltage regulator 6 includes a photosensitive element 3 which receives light from the object to be photographed, this light first traveling through the objective of the camera before reaching the photosensitive means or element 3. Also the light-responsive means includes a diode 4 connected in series with the photosensitive element 3 and acting as a logarithmic compression element.

The circuit which is supplied from the voltage regulator 7 is a signal-transmission means formed by the memory capacitor 9 which is charged to an extent corresponding to the exposure-determining factors, and between the signal-transmission means 9 and the voltage regulator 7 there is a logarithmic expansion circuit 8. This latter circuit is normally grounded through the switch 10. This switch 10 is normally closed. When the shutter is opened, however, through an unillustrated mechanism the switch 10 is opened in synchronism with the opening of the shutter, so that the logarithmic expansion circuit 8 is at this time disconnected from ground and is instead connected in series with the memory capacitor 9, upon opening of the shutter.

The several exposure-determining factors, namely the lighting conditions, the exposure aperture magnitude, and the film speed, are added by the circuit 5 whose output current charges the capacitor 9 through the normally closed switch 11 until the terminal voltage of the capacitor 9 attains the voltage level of the output from the circuit 5, this charging operation taking place while the switches 10 and 11 remain closed. When the tiltable mirror of the single lens reflex camera snaps upwardly beyond the path of light traveling along the optical axis through the objective, immediately prior to opening of the shutter, the switch 11 simultaneously opens, with the switch 10 also opening simultaneously with the opening of the shutter, as referred to above, so that the charging of the signal-transmission means 9 with the signals to be used in determining the exposure continues from the time when the camera is directed toward the object to be photographed (actually from the time when the main switch 16 is closed) until the time when the switch 11 opens.

The junction between the switch 11 and the signal-transmission means 9 and a switching circuit means 12, referred to in greater detail below, are interconnected by way of a resistor 9a, so that through this resistor the signal-transmission means 9 is connected with the switching circuit means 12. An indicating means 13, in the form of a suitable meter, is connected in parallel with the switching circuit means 12. This switching circuit means 12 has at its output a transistor 14 which is connected at its base to the remainder of the switching circuit means 12, and through the transistor 14 the switching circuit means 12 is connected to the voltage source 17 through a circuit which is thus controlled by the transistor 14. This latter circuit includes not only the energizing source 17 but also the main switch 16, which is automatically closed during the initial increment of movement of the shutter-tripping plunger, before the shutter is actually tripped, a switch 15 connected in series with the switch 16 and automatically closed in a known way just prior to opening of the shutter as the mirror is snapped upwardly, and an electromagnetic means 2 which is connected in series between the transistor 14 and the switch 15. This electromagnetic means 2, when it is deenergized, will in a known way release a trailing curtain of the shutter so that the trailing curtain will run down to its rest position for closing the shutter. Thus, the electromagnetic means 2, the switch 15, and the switch 16 are connected in series between the transistor 14 and the battery 17.

The circuit 5 for adding the exposure-determining factors includes three variable resistor means 19, 20, and 21. These three variable resistor means are connected in parallel between the terminals 1b and 1c of the converter 1. It will be noted that the light-responsive means formed by the circuit which includes the components 3 and 4 is connected from the junction 32 between the components 3 and 4 through a change-over switch means 18 to one or the other of the variable resistor means 19 and 20, so that in this way the exposure-determining factor of the lighting conditions at the object to be photographed is added to the other factors of the magnitude of the exposure aperture and the film speed, these three factors forming when added together the signal which is supplied to the signal-transmission means formed by the memory capacitor 9. Thus, the signal according to the lighting conditions is added, in the position of the parts shown in FIG. 1, by way of the switch 18 to the aperture magnitude signal derived from the variable resistor 20 which is connected in parallel with the variable resistor means 21 which provides the film speed signal, so that these three signals are combined to form the output of the circuit 5 which is delivered to the capacitor 9 while energizing takes place by way of the independent constant voltage from the converter 1. The magnitude of the signals will depend upon the intensity of the light received by the photosensitive element 3 as well as the positions of the movable electrically conductive components of the variable resistor means 20 and 21. In this way the charging of the memory capacitor 9 is regulated in accordance with the exposure-determining factors.

The variable resistor means 20 is in the form of a potentiometer having a slidable contact which forms the electrically conductive component connected to the switch 18 in the position of the parts shown in FIG. 1. This variable resistor means 20 is adapted to be used with an objective which is automatic in the sense that it remains wide open and is automatically stopped down to a preselected aperture just prior to exposure. Such objectives are well known. The objective has an aperture setting ring which is turned to set the diaphragm for providing a predetermined aperture just prior to exposure. When this ring is turned through an unillustrated transmission the slider of the potentiometer 20 is shifted along the potentiometer to introduce into the circuit the factor of the size of the exposure aperture. The sliding contact of the potentiometer 21 is moved in the same way by way of a ring which is used to introduce into the camera a value corresponding to the speed of the film which is exposed. In this way the variable resistor means 21 will introduce a signal according to the film speed. The voltage control function achieved with these potentiometers 20 and 21 is such that a variation of the preselected lens aperture value corresponding to one graduation of the diaphragm setting ring and a variation of the film speed value corresponding to one graduation of the speed setting ring are maintained in correspondence with a variation of the light intensity by one incremental value such as one light value. Therefore, the output of the circuit 5 is a voltage corresponding to the added information derived from the light intensity at the object to be photographed, the preselected aperture magnitude, and the film speed.

The diaphragm setting ring will, as is well known, determine the size of the aperture through which the film is actually exposed. However, this ring does not actually stop the diaphragm down to a position corresponding to the setting of the ring. This latter stopping down of the diaphragm is brought about automatically just prior to exposure, as pointed out above. For this purpose the diaphragm setting ring of such an automatic objective is coupled to the sliding contact of the potentiometer 20 in such a way that a pawl or other motion-transmitting element which moves together with the diaphragm setting ring extends from the lens barrel of the objective into the interior of the camera housing to transmit the motion to the sliding contact of the potentiometer 20. Thus, in order to obtain this type of coupled operation an automatic objective has a special structure for transmitting the motion from the diaphragm setting ring to the potentiometer.

However, it is also possible to use with a camera such as a single lens reflex camera a single stage lens which is commercially available and which must be manually stopped down to the required aperture since such lenses do not have motion-transmitting elements which extend into the camera for preliminarily setting a potentiometer to a setting which corresponds to a selected aperture. When such a non-automatic, manually adjustable objective is used with the camera, measurement of the light which travels through the objective takes place in a restricted manner through an aperture which has already been stopped down to the selected value. During light measurement through such a stopped down aperture, it is not possible to obtain a useful function from the potentiometer 20 and if the potentiometer 20 is used in determining the extent of exposure there will be an unavoidable error, this error occurring of course in the light measurement.

In the example shown in FIG. 1, the change-over switch means 18 normally assumes a position engaging the contact 18b of the adjustable component of the potentiometer or variable resistor means 19. The projection from the automatic objective, when the latter is mounted on the camera, serves not only to transmit movement from the diaphragm setting ring to the adjustable component of the variable resistor means 20, but also to displace the switch 18 to the position shown in FIG. 1 where it engages the contact 18a of the adjustable component of the variable resistor means 20. Therefore, when using a non-automatic objective which must be manually stopped down, the information or signal with respect to the light intensity is added to the variable resistor 19. This second variable resistor means 19 has its movable adjusting component fixed by the manufacturer after displacement to a position establishing a condition according to which the resistance value provided by way of the potentiometer or variable resistor means 19 corresponds to the resistance which would be derived from the potentiometer 20 with the latter short-circuited or bypassed.

In this connection, such a circuit arrangement is shown in the embodiment illustrated in FIG. 4 which differs from that of FIG. 1 only in that the potentiometer or variable resistor means 20 is indeed provided with such a bypass switch means 22, as referred to above. Thus, it will be seen from FIG. 4, that the bypass switch means 22 is connected between the potentiometer 20 and the slidable contact thereof, so that when the switch 22 is closed the potentiometer is bypassed in such a way that it achieves a constant voltage control function irrespective of the position of the sliding contact. This switch 22 is a normally closed switch. The motion-transmitting element carried by the automatic objective will act on this switch 22 in order to open it only when such an automatic objective is used. Therefore a manually adjustable objective, which is to say an objective which must have its diaphragm manually stopped down, will not influence the switch 22 which thus remains closed when using such an objective. Therefore in the closed position of the switch 22 the potentiometer 20 provides a constant voltage control function irrespective of the position of its sliding contact. The resistance value achieved from the potentiometer 20 at this time corresponds to that which is achieved from the potentiometer 19 when its slidable contact is fixed by the manufacturer. This potentiometer 19 is useful in measuring the light even through an automatic objective when the latter is in a condition where its diaphragm is actually stopped down.

Thus, with the above structure of FIGS. 1 and 4, when the change-over switch means 18 engages the contact 18a, light measurement is made through a wide open objective with the diaphragm setting being preselected but not actually achieved until automatic stopping down takes place just prior to exposure. On the other hand, when the change-over switch means 18 engages the contact 18b, it connects into the circuit the variable resistor means which is adapted to cooperate with an objective which must be manually stopped down with light measurement taking place through the restriction provided by the stopped down diaphragm. Of course, this type of operation is also effective even with an automatic objective after the diaphragm thereof is stopped down. It is to be noted that when the switch means 18 engages the contact 18b, the potentiometer 20 is disenabled even if the switch 22 is opened, so that it is indeed possible to carry out light measurement through a stopped down objective even if this objective is of the type which normally is automatically stopped down just prior to exposure. In other words it may sometimes happen that an automatic objective is used in such a way that its diaphragm is already in a stop-down condition during measurement of light, and even in this case the circuitry of FIGS. 1 and 4 will operate properly.

Thus, the exposure-determining factors supplied to the circuitry through the above-described signal supply means are stored in the form of an electrical charge in the signal-transmission means formed by the capacitor 9, and this capacitor 9 will temporarily hold this charge since the switch 11 is opened immediately before the tiltable mirror is snapped upwardly. More specifically, any rays of light which happen to pass through the objective after the mirror has snapped upwardly will not reach the photosensitive element 3 so that the signal information stored by the capacitor 9 is effectively prevented from being disturbed by signals which otherwise would continue to be provided by the photosensitive element 3. This element 3 is in a position to receive light which has passed through the objective and which is reflected by the tiltable mirror, so that when the latter has swung upwardly beyond the optical axis there is no longer any impingement of light on the element 3 from the object which is to be photographed.

The switching circuit means 12 receives from the signal-transmission 9 the signal corresponding to the addition of the exposure-determining factors as described above. This switching circuit means 12 includes a field effect transistor 42 of high input impedance and a variable resistor 23 connected to the output terminal of the transistor 42, this variable resistor 23 also forming a potentiometer having a sliding contact 24. This contact 24 forms part of a mechanism referred to below which operates in a mechanical way to bring about an exposure time of extremely short duration. The switching circuit means 12 further includes a switching element 25 such as a thyristor for controlling the deenergizing of the electromagnetic means 2, and the sliding contact 24 of the variable resistor means 23 is electrically connected to the control electrode of the thyristor 25.

The switch 15 is automatically closed just before the shutter is opened, while the tiltable mirror snaps upwardly, and at this instant the charge stored in the memory capacitor 9 is insufficient to render the switching element 25 conductive. Therefore, the transistor 14 remains in its conductive state to maintain the electromagnet 2 in its energized condition. As a result the electromagnetic means 2 holds the elements which are required to be released in order to permit the shutter to close, and thus these elements are prevented from operating even before the shutter opens, when the electromagnetic means 2 is energized by closing of the switch 15.

The circuitry includes an additional field effect transistor 26 connected in parallel with the field effect transistor 42. An indicating means 13, in the form of a suitable meter such as an ammeter, is connected to the transistor 26 in parallel with the output load resistance 27 thereof. This indicating means 13 takes the form of an exposure meter structure in which an ammeter is utilized as the indicating instrument.

During transmission of the signal from the memory capacitor 9 to the switching circuit means 12, the transistor 26 controls the electric current which flows therethrough in accordance with the magnitude of the signal. Thus, the transistor 26 will serve to reliably transmit the signal stored in the capacitor 9 to the indicating means 13 in the form of a meter which is controlled in accordance with the magnitude of the signal. This structure for giving an indication of the result of the measurement of the light and the addition of the other exposure-determining factors includes the transistor 42 of high input impedance which forms the input for the switching circuit means 12 and the separate parallel-connected transistor 26 of high input impedance, so that the switching circuit operation with this circuitry is completely free of any electrical disturbance from the indicating means 13 which otherwise would occur if the parallel connection through the separate transistor 26 were not provided. Therefore the operation of the switching circuit means 12, on the one hand, and the indicating means 13, on the other hand, never interfere with each other. The value which is indicated by the indicating means 13 corresponds to a shutter speed, and this indicating means 13 may be provided with a scale of shutter speeds having graduations which cooperate with the movable pointer so that the operator can directly read from the meter 13 the exposure time which will be provided by the circuitry, this exposure time being directly measured in seconds on the scale at the meter 13 and corresponding to the magnitude of the signal which is transmitted to the switching circuit means 12 by the signal-transmission means 9. The indication given by the indicating means 13 is provided through a suitable switch which becomes closed automatically during the initial part of the depression of the shutter-tripping plunger, before the shutter is actually tripped, so that after slight depression of the shutter-tripping plunger it is possible to measure at the meter 13 factors such as the light at the object to be photographed, and the operator may hold the shutter-tripping plunger in a partially depressed condition in order to preliminarily see at the meter 13 the value of the shutter speed which will be provided by the circuitry if the depression of a shutter-tripping plunger is continued to actually trip the shutter.

During the further depression of this shutter-tripping plunger the tiltable reflector is snapped upwardly in a known way, and the switch 11 is automatically opened through a suitable transmission during the initial part of the depression of the shutter-tripping plunger. The memory capacitor 9 thus remains in its condition corresponding to that which results just prior to opening of the switch 11. The tiltable mirror snaps upwardly and then with the completion of the depression of the shutter-tripping plunger the shutter opens.

In synchronism with the opening of the shutter the switch 10 opens, and as this switch 10 opens the capacitor 9 is additionally charged through the logarithmic expansion circuit 8 from the voltage regulator 7. Then the input voltage of the switching circuit means 12 attains the level at which the switching circuit 12 transfers to a conductive state as the charging of the capacitor 9 continues, and thus the switching circuit 12 will suddenly transfer to a state of electrical continuity or conductivity. Therefore, the duration of the interval from the start of the additional charging through the logarithmic expansion circuit 8 to the transfer of the switching circuit means 12 to the state of electrical conductivity corresponds to the timing signal which determines the duration during which the shutter remains open, or in other words the duration of the exposure. The manner in which such a timing value is achieved is described in detail in copending application Ser. No. 28,457, filed Apr. 14, 1970 so that it is not described further.

It is possible to achieve control of relatively long exposures, for example longer than 1/500 sec., with extremely great precision through the operation of the above circuitry by corresponding regulation of the switching level of the switching element 25. However, control of shorter exposures where the exposure time is at an extremely high speed range on the order of 1/1,000 sec., for example, tends to be unstable due to factors such as the time lag in the operation of the electromagnet 2. A mechanical shutter control mechanism may be operated preliminarily to achieve an effective control with extremely short exposure times in cases such as the photographing of objects which move at high speed. Under these conditions control of the shutter by the electrical circuitry which includes the switching circuit means 12 should be avoided so that this switching circuit means should not operate at this time. This type of operation is achieved by deenergizing the electromagnet 2 so that it will release the trailing curtain and thus terminate the exposure.

For this purpose, there is provided at the switching circuit means 12 a control means which controls the electromagnet in order to achieve, in a mechanical way, an extremely short exposure time. This control means includes the sliding contact 24 of the variable resistor 23 which for this purpose assumes a position displaced along the resistor 23 to a location where a bleeder voltage is produced at the sliding contact 24 in association with the change-over from electrical control to mechanical control. The arrangement is such that this bleeder voltage is sufficiently positive and of such a magnitude that it is great enough to transfer by itself the switching element 25 to the conductive state at the instant when the memory capacitor 9 is completely charged.

Thus, through the control achieved with a bleeder voltage resulting from the displacement of the contact 24 in association with the thyristor 25 it is possible to achieve in a mechanical way a deenergizing of the electromagnet 2 suitable for high speed operation where an extremely short exposure time is required.

During normal operation with longer exposure times, the switching element 25 transfers to its state of electrical conductivity and the voltage on the anode side thereof drops sharply. A Zener diode 26 is inserted between the anode of the thyristor 25 and the base of the transistor 14. As long as the thyristor 25 is in a non-conductive state, the Zener diode 26 is in its conductive state since the Zener diode 26 is provided with voltage higher than its Zener voltage as a result of energizing of the Zener diode 26 from the voltage regulator 6. At the instant when the element 25 transfers to its conductive state the Zener diode transfers to its non-conductive state since the input voltage to the diode 26 will drop instantaneously at this time.

The transistor 14 transfers to its non-conductive state only under regulation of the magnitude of the control signal from the Zener diode 26 which is connected to the control electrode of the transistor 14, this operation taking place without any delay due to the counter electromotive force generated when the electromagnetic means 2 connected in series with the switching transistor 14 and serving to initiate the shutter-closing operation is deenergized. More specifically, this transistor 14 transfers completely to its state of electrical discontinuity when the control signal to the transistor 14 is instantaneously eliminated by the Zener diode 26 according to the signal from the switching element 25 at the instant when the latter becomes conductive. In this way the electromagnetic means 2 becomes deenergized so that the trailing curtain is released from the holding effect of the electromagnetic means 2 and starts to run in order to terminate the exposure by closing the shutter.

The circuitry provides a highly effective operation of the electromagnetic means 2. This electromagnetic means 2 which has a high power requirement is energized by way of the switch 15 just prior to opening of the shutter. The instant when the electromagnetic means 2 is energized is selected in such a way that the duration of operation of the electromagnetic means 2 is reduced to a minimum. Therefore, the switch 15 is not closed until the final moment before opening of the shutter, so that in this way the electromagnetic means 2 will reliably hold the trailing curtain but at the same time will be maintained energized for a minimum duration. Accordingly, it is important to reduce to a minimum the time lag from the instant of closure of the switch 15 to activation of the electromagnetic means 2. This result is effectively achieved by supplying a large quantity of electricity to the electromagnetic means 2. The battery 17 itself, however, has an internal resistance, with the result that it is difficult to provide a large quantity of electricity instantaneously. With the circuitry disclosed in FIG. 1, however, a capacitor 40 is connected through the main switch 16 in parallel with the battery 17, and the capacitor 40 will have its discharge circuit established through the electromagnetic means 2 upon closing of the switch 15. Thus, the capacitor 40 forms a means for supplying to the electromagnetic means 2 power in addition to that which is derived directly from the battery 17 upon closing of the switch 15. Prior to closing of the switch 15 the capacitor 40 is preliminarily charged from the battery 17 through the main switch 16 which is closed prior to closing of the switch 15. Thus, the charge which has been stored on the capacitor 40 is discharged to the electromagnetic means 2 at the instant when the switch 15 closes and the electromagnetic means 2 is accordingly sufficiently energized by the additional energy from the capacitor 40 as well as the energy from the battery 17 to achieve an instantaneous activation of the electromagnetic means 2. In this way the above time lag is very substantially reduced.

In addition, while a DC current is supplied to the electromagnetic means 2 from the battery 17, a feeble AC component is applied to the circuit which energizes the electromagnetic means 2 from the DC-DC converter 1 by way of the circuit which connects the battery 17 and the converter 1 to each other, so that in this way a rippled direct current composed of an AC output and the output from the battery 17 is supplied to the electromagnetic means 2. This rippled current effectively acts upon the electromagnetic means 2 when the transistor 14 is turned off. The ripple form of current acts so that it is possible for an electromagnetically attractive force generated due to magnetic hysteresis of the electromagnetic means 2, upon deenergizing thereof, to be rapidly counteracted by the ripple current as the switching circuit means 12 transfers to the electrically conductive state and the transistor 14 completely transfers to the electrically non-conductive state. Accordingly, upon deenergizing of the electromagnet 2, its holding effect on the trailing curtain is immediately given up and shutter closing takes place instantaneously without any possible delay of the type referred to above.

Thus, this circuitry for controlling the electromagnetic means 2 is useful to reduce the time lag with respect to the moment when the electromagnetic means 2 is energized as well as the time lag with respect to the instant when the electromagnetic means 2 is deenergized, with time lags at both of these instants being reduced to a minimum so as to bring about a highly effective precision in the operation.

Figure 2:
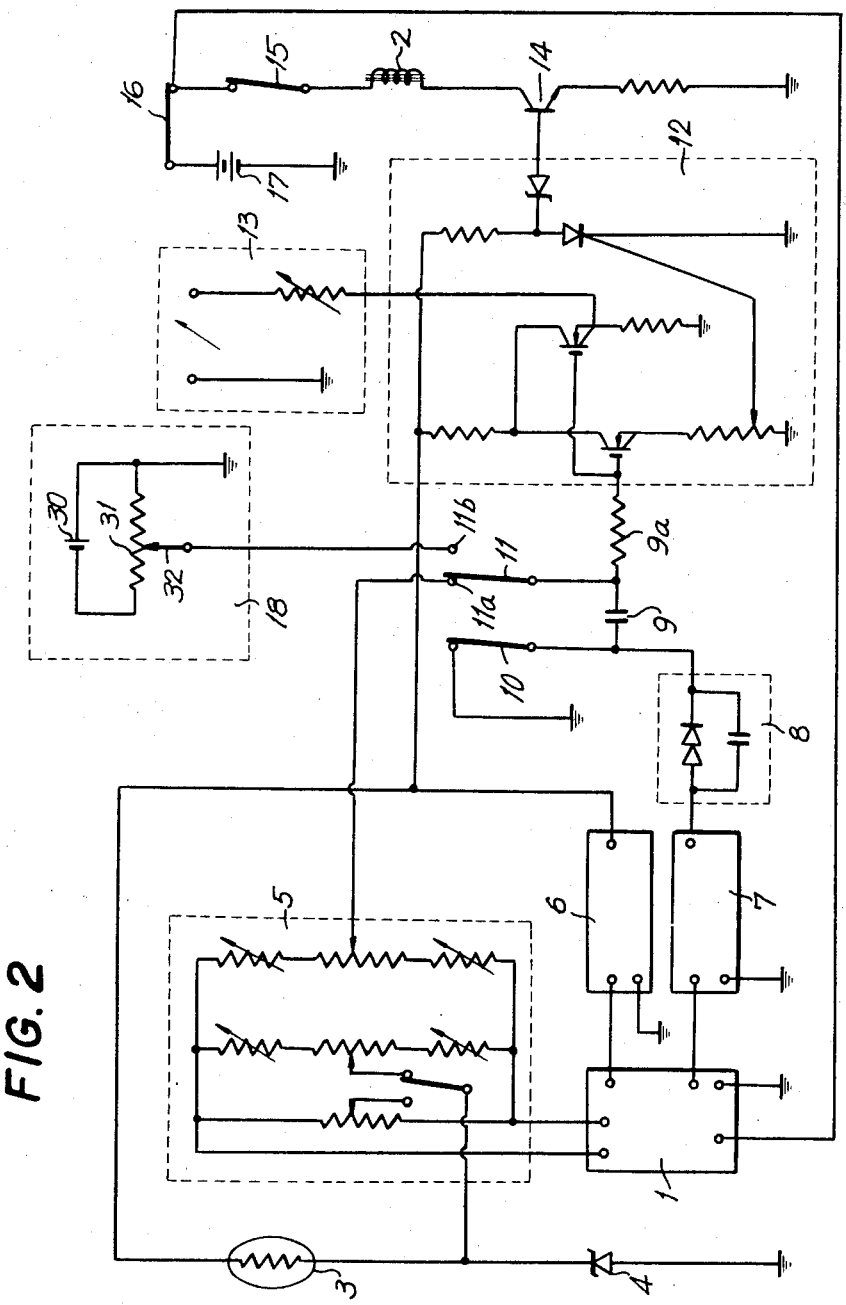
FIG. 2 illustrates another embodiment of circuitry for achieving automatic as well as manually-determined exposure.

In the embodiment described above the memory capacitor 9 is charged with the output from the exposure-determining factor adding circuit 5, and the exposure time is automatically determined according to the factor of light intensity and the additional factors added by the circuit 5. With the embodiment of FIG. 2, the switch 11 has the form of a change-over switch serving to selectively connect into the circuit either the signal-supply means formed by the circuit 5 and the light-responsive circuit or an additional manually operable signal-supply means formed by components 30-32 and connected to the contact 11b of the change-over switch 11 of FIG. 2. The contact 11a of this change-over switch serves to transmit to the circuitry the signals from the signal-supply means referred to above.

The manually operable signal-supply means 30-32 supplies a bleeder voltage output terminal 32 of the bleeder circuit 31 which is connected to its own independent power source 30. The output terminal 32 is movable relative to the bleeder resistance 31 so that the output voltage can be manually determined. This manual determination of the magnitude of this output voltage may be brought about by turning a suitable dial which is displaced in accordance with shutter speed graduations.

Thus, when the operator selects to manually determine the exposure time, the switch 11 will be placed in engagement with the contact 11b, and now the capacitor 9 is charged to the level of the bleeder output voltage of the manually operable signal-supply means. When the bleeder output voltage is that resulting from operation in accordance with a selected shutter speed graduation, the information or signal stored in the capacitor 9 takes a value corresponding to this graduation and the selected shutter time corresponding to the selected graduation is achieved by additional charging in precisely the same way as during automatic control in the manner described above. In this way it is possible to achieve with the embodiment of FIG. 2 a manually selected exposure time while utilizing only a minimum amount of additional structure with the same controls, except for the signal supply means, being used both for automatic and manual exposure time determination.

Figure 3:
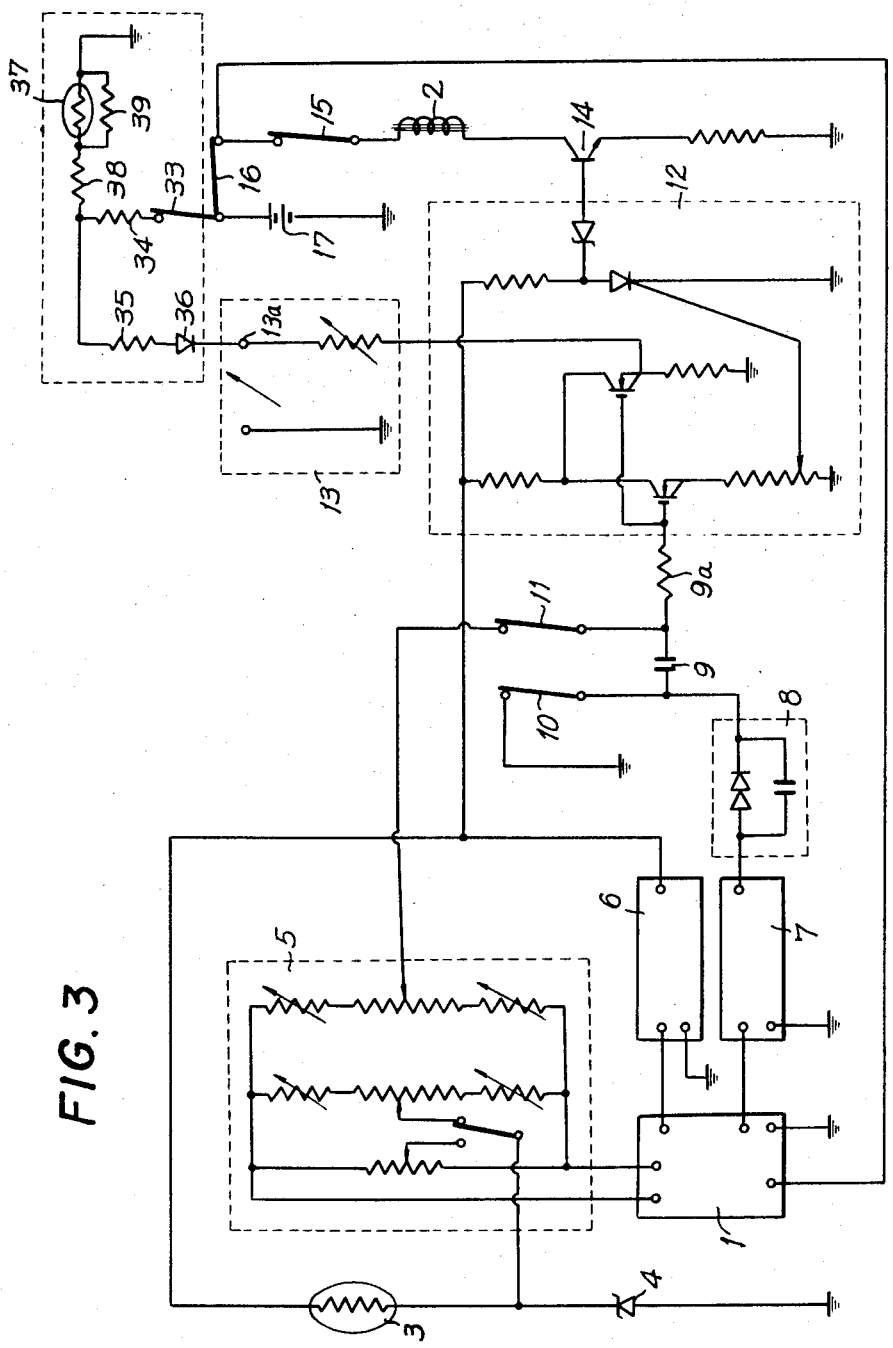
FIG. 3 is a third embodiment of circuitry, this embodiment having a voltage source checking circuit.

The embodiment of FIG. 3 corresponds to those described above except for the following differences. This embodiment includes a manually operable switch 33 for opening and closing a checking circuit means capable of checking the condition of the voltage source 17. The normally open manually operable switch 33 serves to connect the battery 17 to a resistor 34 of the checking circuit, this resistor 34 being connected in series with a resistor 35 which in turn is connected with a diode 36 inserted in a forward direction with respect to the battery 17 which serves as a DC power source. These components of the checking circuit means are connected in series between the battery 17 and the input terminal 13a of the indicating means 13. The checking circuit means further includes a thermal compensating element 37 and adjusting resistances 38 and 39 which are connected in parallel with the resistance 35, the diode 36, and the indicating meter 13 so as to achieve in this way a voltage checking circuit for determining the condition of the battery 17 as the DC power source.

During checking of the voltage of the battery 17, the switch 33, which normally remains open, is manually closed. Of course, before closing the switch 33 the main switch 16 is opened so that there will be no interference with the checking of the condition of the battery 17 from the remainder of the circuitry. Closing the switch 33 initiates the energizing of the indicating means 13 through the resistances 34 and 35 and the diode 36 from the battery 17, so that the voltage of the battery 17 may be reliably checked through reading this voltage which is indicated at a suitable scale of the meter 13 under regulation of the thermal compensating element 37. The diode 36 provided for checking of the voltage of the battery 17 as a DC power source is inserted in the forward direction with respect to the battery 17 so that the operation of the voltage checking circuit will have no influence on the operation of the indicating means 13 when the switch 33 is opened. Thus the same meter 13 can be used for preliminarily indicating to the operator the exposure time which will be automatically achieved, as pointed out above, as well as for battery checking purposes, without the checking circuit having any influence on the meter 13 when the switch 33 is open. Therefore, during measurement such as light measurement to control the electric shutter the battery checking circuit will have no undesirable influence as a result of the diode 36.

Thus, the above circuitry assures a highly reliable operation by providing the above checking circuit which enables the battery 17 to be maintained in proper operating condition, as well as by providing a multi-source system formed by the DC-DC converter 1 and the voltage regulating means 6 and 7 in each load circuit which is likely to be thermally influenced in an undesirable manner.

What is claimed is:

1. In a camera having circuitry for automatically determining the extent to which film in the camera is exposed, a power source electrically connected with said circuitry for supplying energy thereto, said circuitry including an electromagnetic means for terminating an exposure when said electromagnetic means becomes unenergized, switch means electrically connected between said power source and said electromagnetic means for energizing the latter just prior to opening of a shutter to start an exposure, and means electrically connected to said electromagnetic means through said switch means for supplying said electromagnetic means upon closing of said switch means with energy in addition to that supplied only by connecting said electromagnetic means to said power source through said switch means for reducing the time lag required for energizing of said electromagnetic means to a minimum.

2. The combination of claim 1 and wherein said means connected electrically to said electromagnetic means through said switch means for providing said additional energy is a capacitor means.

3. The combination of claim 2 and wherein a second switch means is electrically connected between said capacitor means and said power source for charging said capacitor means prior to closing of said first-mentioned switch means.

4. The combination of claim 3 and wherein said second switch means is connected in series between said first-mentioned switch means and said power source, said first-mentioned switch means being connected in series between said second switch means and said electromagnetic means, and said capacitor means being electrically connected to a junction between both of said switch means.

* * * * *

UNITED STATES PATENT OFFICE
CERTIFICATE OF CORRECTION

Patent No. 3,745,901　　　　　　　　Dated July 17, 1973

Inventor(s) Miyakawa, Seinan, et al.

It is certified that error appears in the above-identified patent and that said Letters Patent are hereby corrected as shown below:

In the heading, between items [21] and [52] insert:

[30] Foreign Application Priority Data

May 14, 1971　Japan......1971-38182

May 19, 1971　Japan......1971-39719

Signed and sealed this 10th day of December 1974.

(SEAL)
Attest:

McCOY M. GIBSON JR.　　　　　　　C. MARSHALL DANN
Attesting Officer　　　　　　　　Commissioner of Patents